United States Patent
Wang et al.

(10) Patent No.: US 12,089,152 B2
(45) Date of Patent: Sep. 10, 2024

(54) APPARATUS, SYSTEMS, AND METHODS FOR BATTERY LIFE BASED WIRELESS COMMUNICATION SCHEDULING

(71) Applicant: Cypress Semiconductor Corporation, San Jose, CA (US)

(72) Inventors: Xianmin Wang, Westfield, NJ (US); Hui Luo, Marlboro, NJ (US); Hongwei Kong, Basking Ridge, NJ (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 5 days.

(21) Appl. No.: 17/585,771

(22) Filed: Jan. 27, 2022

(65) Prior Publication Data

US 2022/0225232 A1 Jul. 14, 2022

Related U.S. Application Data

(63) Continuation of application No. 16/825,630, filed on Mar. 20, 2020, now Pat. No. 11,240,755.

(51) Int. Cl.
*H04W 52/02* (2009.01)

(52) U.S. Cl.
CPC ... *H04W 52/0216* (2013.01); *H04W 52/0261* (2013.01)

(58) Field of Classification Search
None
See application file for complete search history.

(56) References Cited

U.S. PATENT DOCUMENTS

| | | | |
|---|---|---|---|
| 6,072,784 A * | 6/2000 | Agrawal | H04W 52/28 370/335 |
| 9,699,685 B1 * | 7/2017 | Zhou | H04W 28/0221 |
| 11,240,755 B2 * | 2/2022 | Wang | H04W 52/0216 |
| 2009/0257369 A1 * | 10/2009 | Igarashi | H04W 52/0261 455/574 |
| 2011/0009075 A1 * | 1/2011 | Jantunen | G06K 19/0723 709/227 |
| 2012/0317432 A1 * | 12/2012 | Assad | G06F 1/3212 713/340 |
| 2013/0077610 A1 * | 3/2013 | Amini | H04L 67/12 370/338 |
| 2013/0188541 A1 * | 7/2013 | Fischer | H04W 52/0229 370/311 |
| 2014/0112229 A1 * | 4/2014 | Merlin | H04L 5/0055 370/311 |

* cited by examiner

*Primary Examiner* — Alex Skripnikov
*Assistant Examiner* — Pamit Kaur

(57) ABSTRACT

A method includes comparing a first battery life value of a first wireless device with a second battery life value of a second wireless device, and in response to determining, based on the comparing, that the first battery life value is less than the second battery life, adjusting a communication schedule so a duration of awake state operation of the first wireless device is less than a duration of awake state operation of the second wireless device.

20 Claims, 11 Drawing Sheets

APPARATUS, SYSTEMS, AND METHODS FOR BATTERY LIFE BASED WIRELESS COMMUNICATION SCHEDULING

CROSS-REFERENCE TO RELATED APPLICATIONS

The present application is a continuation application of U.S. Non-Provisional application Ser. No. 16/825,630, filed on Mar. 20, 2020, now U.S. Pat. No. 11,240,755 issued on Feb. 1, 2022, which is incorporated herein by reference in its entirety.

TECHNICAL FIELD

The subject matter relates to the field of wireless communications. More specifically, but not by way of limitation, the subject matter discloses techniques for battery life based wireless communication scheduling.

BACKGROUND

Communication systems transfer data in accordance with one or more wireless communication protocols. For example, a communication system may utilize a wireless local area network (WLAN) communication protocol (e.g., Wi-Fi based on IEEE 802.11 standards), Bluetooth/Bluetooth Low Energy (BT) communication protocols (e.g., based on BT SIG standards), and/or Zigbee (ZB) communication protocol (e.g., based on IEEE 802.15.4 standards). Some communication protocols provide a mechanism for a communication system to wake up for predetermined periods to communicate and sleep during other periods. For example, operating according to the target wake time (TWT) mechanism of the 802.11 standards (e.g., 802.11ax), an access point (AP) can schedule wake intervals during which one or more stations (STAs) in a basic service set (BSS) can operate in an awake state during a TWT session to communicate and operate in a sleep state for the remainder of the wake interval. Many such communication systems are battery-powered wireless devices having a need to minimize unnecessary power consumption.

BRIEF DESCRIPTION OF THE DRAWINGS

Some embodiments are illustrated by way of example and not limitation in the figures of the accompanying drawings in which.

DETAILED DESCRIPTION

Figure 1:
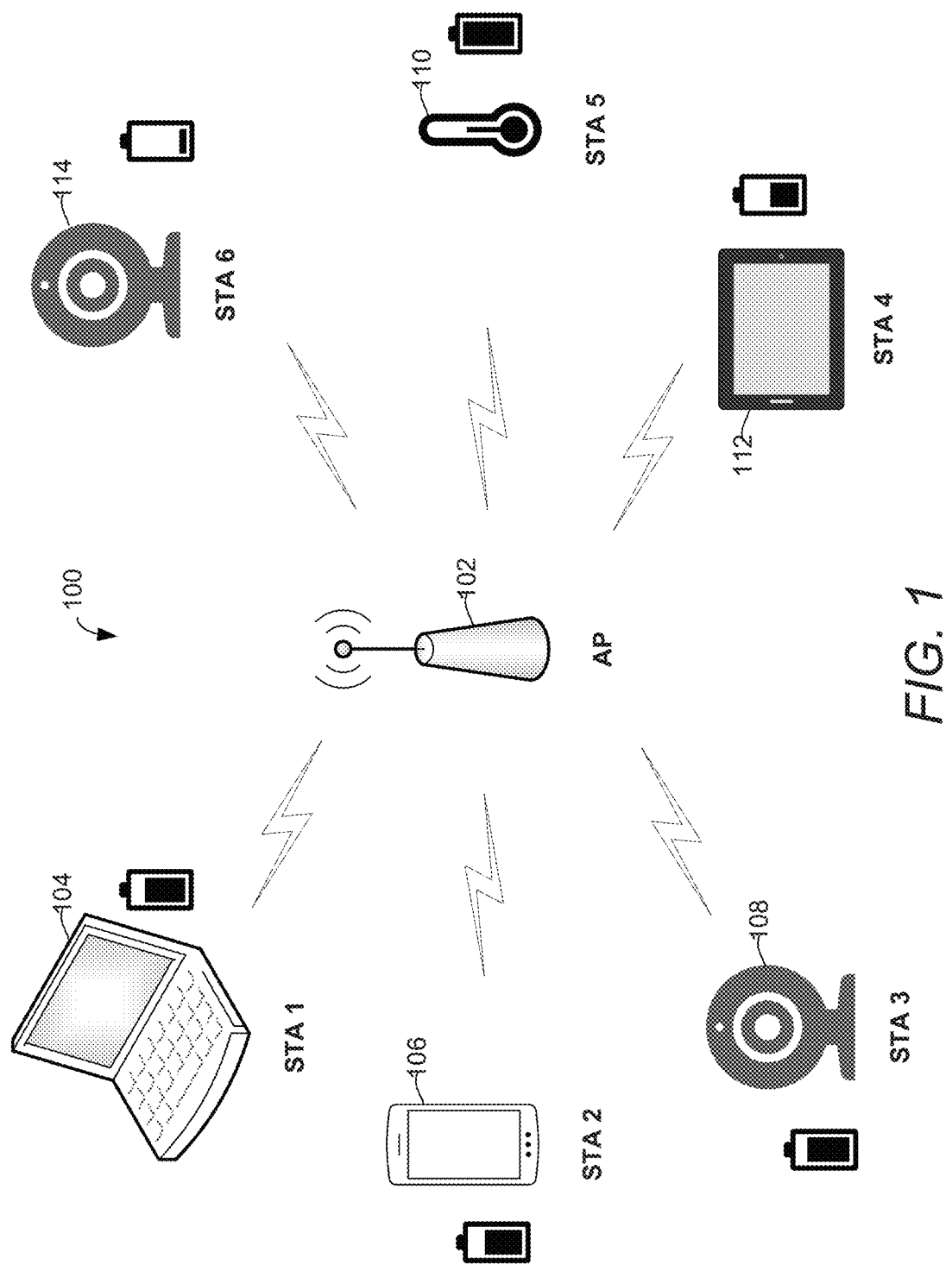
FIG. 1 is a network diagram illustrating a communication network, in accordance with embodiments.

Apparatus, systems and methods for battery life based wireless communication scheduling are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

In networks where wireless devices periodically wake for communication (e.g., according to the 802.11ax TWT mechanism), a central network device (e.g., an AP) may schedule (e.g., using time division multiplexing (TDM)) the wake and sleep timing among the wireless devices. Such central network devices do not conventionally use power status information (e.g., battery life) of any of the wireless devices to define (e.g. or reschedule) wake and sleep timing for communication schedules.

Embodiments described herein provide techniques to dynamically schedule (e.g. or reschedule) wake and sleep timing associated with communication by considering the remaining battery life of a wireless device. The term battery life includes an estimated operation time the battery operated wireless device can run based on its current power consumption rate. For example, battery life may be expressed as a numerical value representing the remaining operation time, where the battery life is calculated based on remaining battery charge (e.g., battery capacity) and instantaneous power consumption rate.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that when executed by data processing apparatus, cause the apparatus to perform the actions.

General aspects include a first communication device determining current or predicted power status associated with the first communication device and transmitting its power status to a second communication device. The second communication device evaluates the power status information and generates a communication schedule (e.g., or an adjusted communication schedule) based on the evaluation, then transmits the communication schedule to the first communication device. The first communication device then manages its own power consumption based on the communication schedule received from the second communication device.

One aspect includes an AP receiving a first TWT element from a first wireless device. The method also includes responsive to the first TWT element, comparing a first battery life value associated with the first wireless device with a second battery life value associated with a second wireless device. The method also includes based on the comparison, adjusting a communication schedule by allocating timeslots of a TWT session to the first wireless device. The method also includes transmitting a second TWT element to the first wireless device, the second TWT element defining the TWT session. Other embodiments of this aspect include corresponding computer systems, apparatus, and computer programs recorded on one or more computer storage devices, each configured to perform the actions of the methods.

One aspect includes a communication device with communication protocol logic configured to receive a first TWT element and a first battery life value from a first wireless device. The device also includes a memory system configured to store a plurality of battery life values. The device also includes a power status evaluator configured to access the memory system to compare the first battery life value with a second battery life value associated with a second wireless device. The device also includes a scheduler, responsive to the first battery life value being less than the second battery life value, configured to associate the first wireless device with a TWT session, where the communication protocol logic is configured to transfer to the first wireless device a second TWT element defining the TWT session.

One aspect includes a communication device including a transceiver. The device also includes communication protocol logic configured to use the transceiver to: transmit a battery life value to an AP, receive, from the AP, an incoming TWT element that is based at least in part on the battery life value, and communicate data with the AP during a TWT session of a TWT wake interval defined by the incoming TWT element, where the communication device is configured to operate in a first mode during the communication of the data and operate in a second mode after the communication of the data and during the TWT wake interval, where the operation in the second mode consumes less battery power than the operation in the first mode.

One aspect includes a system including one or more antennas configured to transmit and receive radio frequency signals. The system also includes an integrated circuit (IC) coupled to the antenna, the IC may include: a transceiver; and communication protocol logic configured to use the transceiver to: transmit an outgoing TWT element and a battery life value to an AP, receive, from the AP, an incoming TWT element that is based at least in part on the battery life value. The system also communicates data with the AP during a TWT session of a TWT wake interval defined by the incoming TWT element, where the IC is configured to operate in a first mode during the communication of the data and operate in a second mode after the communication of the data and during the TWT wake interval, where the operation in the second mode consumes less battery power than the operation in the first mode.

In this way, embodiments can utilize a wireless device's current battery life to schedule wireless device wake and sleep timing such that the depletion rate of the wireless device's battery life is slowed and consequently, operation time for the entire network can be extended. Although some embodiments are described with respect to WLAN communication protocol, other embodiments may be based on other communication protocols such as ZB or BT communication protocols, without departing from the inventive subject matter.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a network diagram illustrating a communication network 100, in accordance with embodiments. Embodiments of the communication network 100 are described with respect to a WLAN but the communication network 100 may utilize other wireless communication protocols without departing from the claimed subject matter. Example network communication devices are shown to include an AP 102 (e.g., or a STA implementing a software AP), STA 1 104 (e.g., laptop computer), STA 2 106 (e.g., mobile phone), STA 3 108 (e.g., wireless camera), STA 4 112 (e.g., tablet), STA 5 110 (e.g., temperature sensor), and STA 6 114 (e.g., wireless camera).

In embodiments, the AP 102 may schedule periods for one or more of the STAs 1-6 to communicate via the wireless medium. During periods that a STA is scheduled to communicate, the STA may power its communication circuitry to enable communication. During periods that the STA is scheduled not to communicate, the STA need not consume power to operate its communication circuitry, thus saving power. In embodiments, when the communication network 100 is compatible with 802.11ax, the AP 102 may utilize TDM to schedule TWT sessions associated with one or more of the STAs 1-6. The AP and a STA may agree on wake periods for the STA to transmit and/or receive data packets and doze periods during which the STA can conserve energy (e.g., battery power). An example TWT mechanism is described in more detail with respect to FIG. 2. AP scheduling of TWT sessions not only conserves energy it can also reduce contention among STAs and support collision free and deterministic operation that meets quality of service targets.

In embodiments, a battery capacity of each battery operated STA 1-6 represents a measure of charge stored by the STAs battery. Of course, battery capacities and power consumption rates may vary among STAs depending on device specifications and the functional demands of the STA. As used herein, battery life represents an amount of time a STA can continue to operate given its current battery capacity and power consumption rate. For example, the STA 6 114 may have a relatively short battery life when its battery capacity is relatively low and its power consumption rate is relatively high (e.g., to support image processing and frequent wireless transmissions). On the other hand, STA 5 110 may have a relatively long battery life when its battery capacity is relatively high and its power consumption rate is relatively low (e.g., to support occasional temperature sensing and infrequent wireless transmissions).

Conventional APs do not consider battery life of STAs in scheduling periods for STAs to communicate via the wireless medium. The inventors have discovered scheduling techniques that utilize STA's battery life information to extend (e.g., compared to conventional scheduling) the overall time that STAs in the communication network have sufficient battery power to remain operational. Compared to conventional scheduling techniques, embodiments described herein can identify STAs with relatively low battery life and reschedule communication periods to slow power consumption and extend the STAs' remaining battery life. In various embodiments, this is achieved through STAs reporting their battery life and the AP prioritizing TWT session allocation to STAs with the lowest battery life.

Figure 2A:
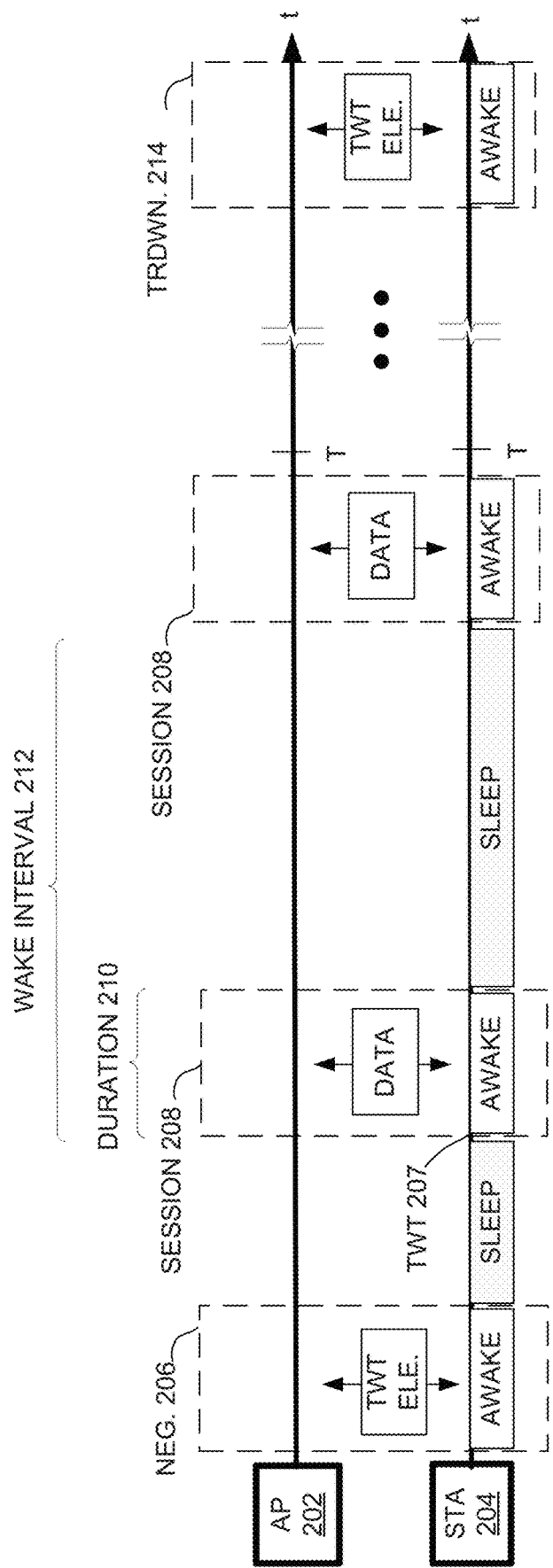
FIG. 2A is a timing diagram illustrating a TWT schedule, in accordance with embodiments.
Figure 2B:
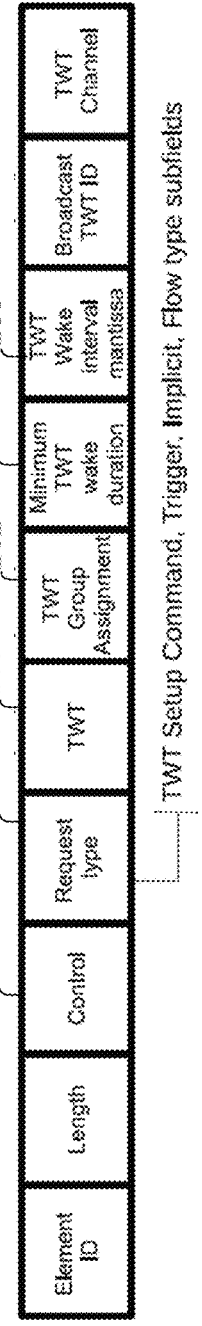
FIG. 2B is an information element diagram illustrating a TWT element, in accordance with embodiments.

FIG. 2A is a timing diagram illustrating a target wake time (TWT) schedule, in accordance with embodiments. FIG. 2B is an information element diagram illustrating a TWT element 250 used by the AP 202 and the STA 204 to negotiate 206, teardown 214, otherwise participate in TWT agreements, in accordance with embodiments. The control field 256 of the TWT element 250 can be used to indicate whether the AP 202 and the STA 204 are negotiating for operation according to individual TWT or broadcast TWT as defined in 802.11ax. Referring to FIGS. 2A and 2B, TWT 207 represents the start time of the first TWT session 208 and the TWT 207 may be indicated in the TWT field 260 of the TWT element 250. TWT sessions 208, having a duration 210 defined in the minimum TWT wake duration field 264, are periods in which the STA 204 operates in an awake state to communicate data with the AP 202. The wake interval 212, defined in the TWT wake interval field 266, is the time interval between the start of adjacent TWT sessions 208. In embodiments, the STA 204 can operate in a sleep or doze state between TWT sessions 208 to conserve energy.

In some embodiments, the AP 202 may support assigning multiple STAs to a TWT session 208 (e.g., a group TWT session) rather than one STA per TWT session 208. In such case, each STA assigned to the TWT session 208 is provided with a group identifier encoded in the TWT group assignment field 262. For example, the STAs in the group may wake up at the start of the TWT session 208 and communicate at non-overlapping times during the TWT session 208. In embodiments, a group STA (e.g., each STA in a group) may communicate responsive to a trigger indicator in the request type field 258 of the TWT element 250. Once a group STA has finished communicating, it may enter into a doze mode for the remainder of the TWT session 208.

Figure 6:
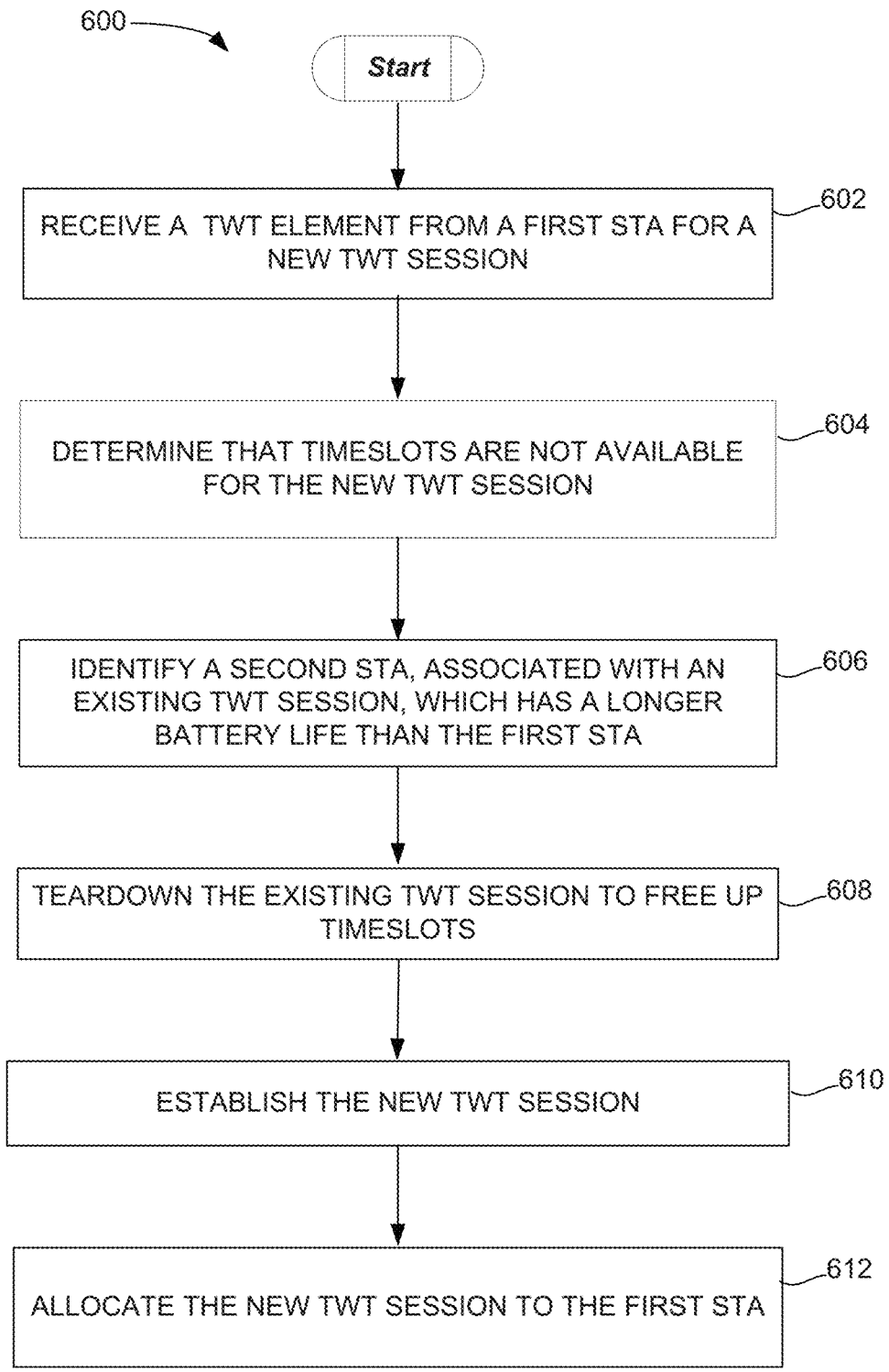
FIG. 6 is a flow diagram illustrating a method of TWT scheduling based on battery life of a STA, in accordance with embodiments.
Figure 8:
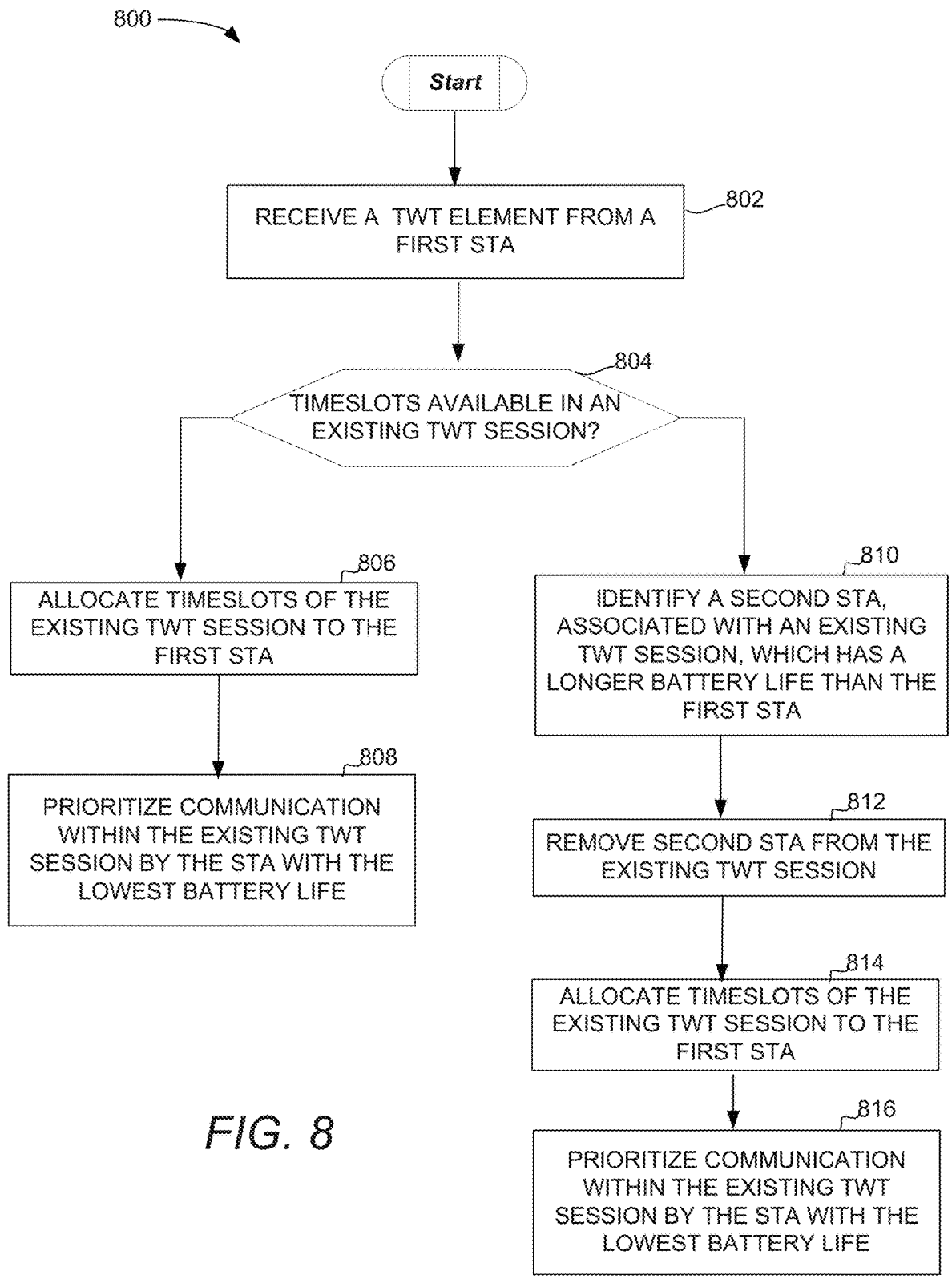
FIG. 8 is flow diagram illustrating another method of TWT scheduling based on battery life of a STA, in accordance with embodiments.
Figure 9:
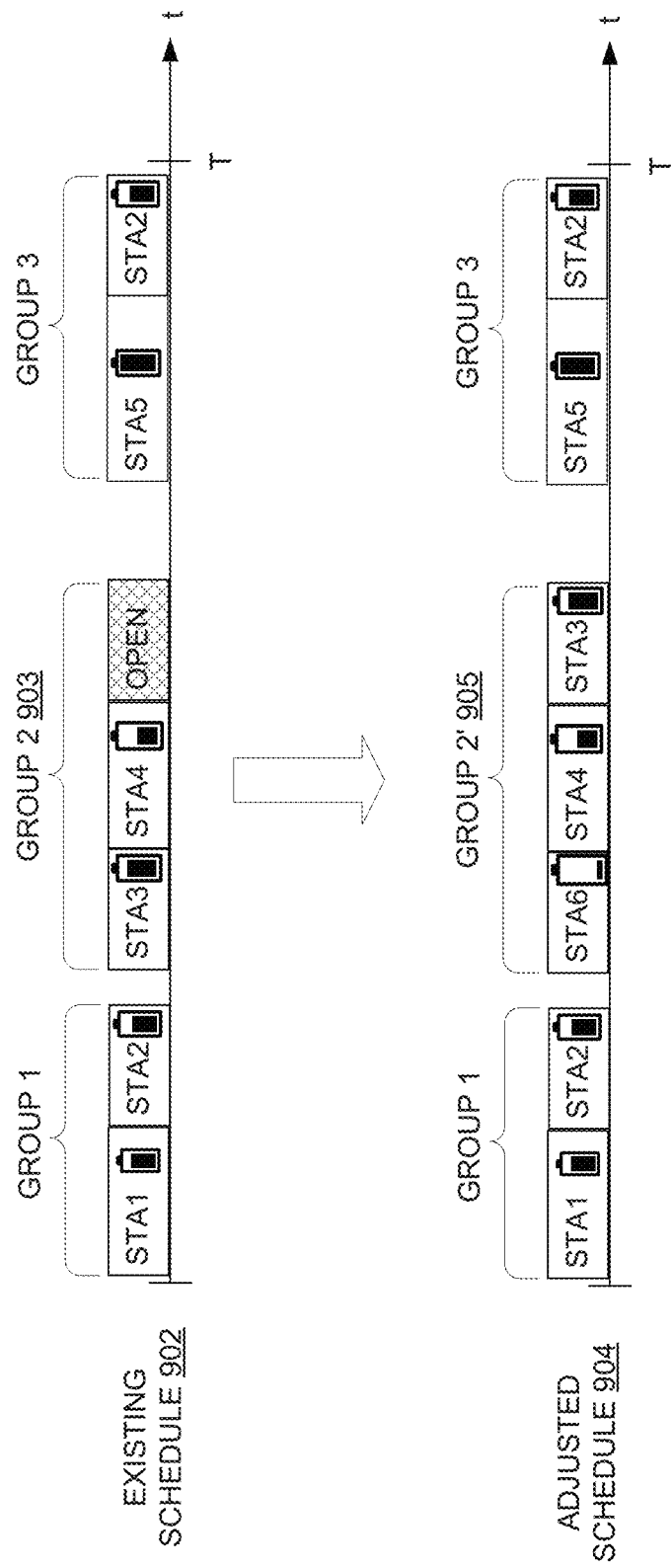
FIGS. 9 and 10 illustrate other adjustments to a TWT schedule based on battery life of a STA, in accordance with embodiments.

Although FIG. 2A shows a TWT session 208 that occurs two times in the fixed period of time T, the TWT session 208 may occur any number of times (e.g., as defined by the wake interval 212) during the fixed period T (e.g., from time zero to time T). In addition, as shown in FIGS. 6, 8, and 9, an AP may schedule other TWT sessions (not shown) during times (e.g., timeslots) that are not occupied by the TWT session 208.

Conventional APs do not consider STAs battery life when scheduling their participation in TWT sessions. For example, when no timeslots are available to schedule a new TWT session for a STA with short battery life, this STA may need to stay awake and contend for medium access using carrier sense multiple access with collision avoidance (CSMA/CA). Also, if a STA with short battery life is the last to be triggered in a group TWT session, it may consume more power than necessary as it waits in an awake mode to be triggered to communicate. As a result, conventional techniques may not allow a STA with short battery life to benefit from potential power saving benefits of the TWT mechanism. Communication devices that use battery life for wireless communication scheduling are shown and described with respect to FIGS. 3 and 4.

Figure 3:
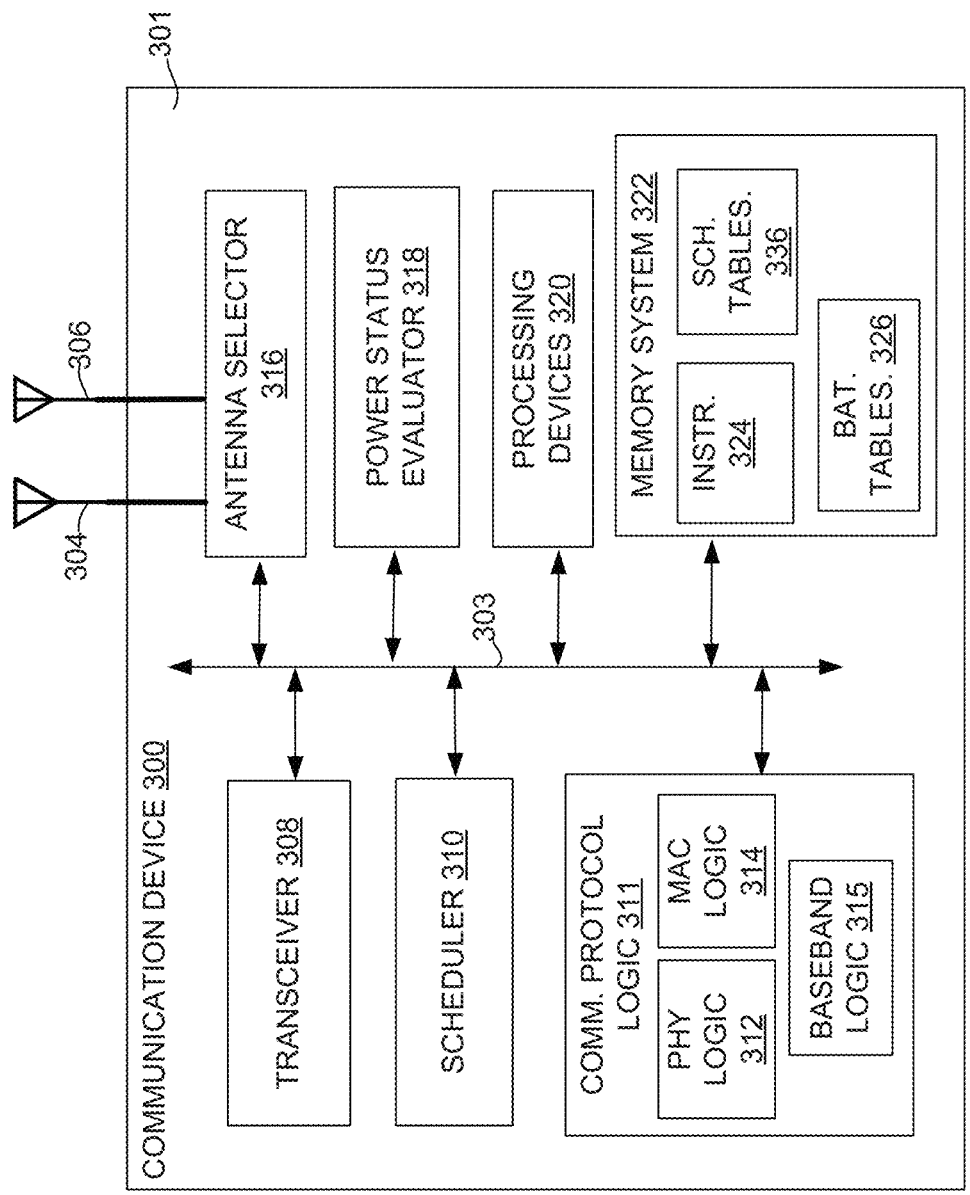
FIG. 3 is a block diagram illustrating a communication device, in accordance with embodiments.

FIG. 3 is a block diagram illustrating a communication device 300, in accordance with embodiments. The communication device 300 may be disposed on a substrate 301 such as a printed circuit board (PCB). The bus system 303 may include inter-chip busses, intra-chip busses, coexistence busses, or any other communication line to connect the circuits and/or logic blocks, which may be disposed on an IC chip or discrete IC chips.

The communication device 300 is shown to include transceiver 308, scheduler 310, communication protocol logic 311, antenna selector 316, power status evaluator 318, processing devices 320, and memory system 322, which are each discussed in more detail below. In embodiments, the communication device 300 may provide the functionality of the AP 102 of FIG. 1.

In embodiments, the processing devices 320 are used to implement communication device 300 operations utilizing instructions 324 (e.g., firmware or microcode) and/or data structures organized within the memory system 322. Although shown as single blocks, processing devices 320 and memory systems 322 may include multiple shared or dedicated resources distributed among the various blocks (e.g., 308, 310, 311, 316, 318) of the communication device 300. Example processing devices and memory systems are described in more detail with respect to FIG. 11.

Communication device 300 may include or be coupled to antennas 304 and 306 through antenna selector 316, which may include any selection logic (e.g., hardware, software, or combination) known in the art. When the antenna selector 316 selects an antenna, it couples the antenna to the transceiver 308 for RF signal reception and transmission. In embodiments, each antenna 304 and 306 can represent one or more antennas. For example, in some embodiments, the antenna selector 316 (e.g., operating as switch circuitry) may couple the communication device 300 to one or more antenna arrays (e.g., a phased array) and/or antenna clusters including any number of antennae (e.g., six or eight) exclusively paired with or shared among communication protocol logic 311.

The transceiver 308 facilitates transmitting and receiving of RF signals according to one or more communication protocols. In embodiments, when operating as a receiver, the transceiver 308 processes received RF signals in the analog domain, digitizes them, and demodulates corresponding digital data to provide a decoded sequence of 1s and 0s to the communication protocol logic 311 for further processing (e.g., packet processing). When operating as a transmitter, the transceiver 308 generally performs the operations in reverse, receiving a sequence of 1s and 0s from the communication protocol logic 311, modulating the signal, and outputting an analog signal for transmission by one or more of the antennas 304 and 306.

The communication protocol logic 311 includes the instructions and hardware to support communication protocols defined by one or more communication protocol standards (e.g., according to WLAN, BT, BLE and/or ZB communication protocols). The PHY logic 312 may include dedicated circuitry and/or processor executed instructions to implement all or portions of electrical and physical specifications of a communication protocol and defines the relationship between the communication device 300 and the transmission medium (e.g., all or portions of the physical layer of the OSI reference model). For example, the PHY logic 312 may establish and terminate connections, provide contention resolution and flow control, and provide modulation, demodulation, and/or conversion between digital data and corresponding wirelessly communicated signals. The MAC logic 314 may include dedicated circuitry and/or processor executed instructions (e.g., control logic) to implement all or portions of the functional and procedural means to transfer data between network entities (e.g., all or portions of the data link layer of the OSI reference model).

In embodiments, the MAC logic 314 is compatible with 802.11ax and is configured to process TWT elements (e.g., inbound and outbound) associated with STAs for the purpose of implementing TWT setup/teardown, TWT scheduling, TWT triggering, and other TWT mechanisms. In embodiments, inbound and outbound TWT elements may be encoded in any 802.11 frame type. For example, an inbound TWT element from a STA may be included in a management frame along with an information element indicating battery life information associated with the STA. The MAC logic 314 may extract and then store the TWT information and battery life information in the memory system 322 to make it available to the scheduler 310 and the power status evaluator 318, respectively. In embodiments, the MAC logic 314 may include or otherwise utilize the scheduler 310 and/or the power status evaluator 318 to schedule TWT sessions for a STA (e.g., the communication device 400).

The communication protocol logic 311 may include baseband logic 315 with dedicated circuitry and/or processor executed instructions to manage physical channels and links and other services like error correction, data whitening, hop selection and security according to BT communication protocol standards. The baseband logic 315 may include a link controller that works with a BT link manager (not shown) in upper BT protocol layers to carry out link level routines like link connection and power control. The baseband logic 315 may also manage asynchronous and synchronous links, handle packets and do paging and inquiry to access and inquire BT devices in the area. In embodiments, similar to the MAC logic 314, the baseband logic 315 may populate and/or inspect packet fields for wake/sleep schedule information and/or battery life information for use by the scheduler 310 and/or the power status evaluator 318.

In embodiments, collaborative coexistence hardware mechanisms and algorithms enable communication subsystems to operate concurrently and/or simultaneously. For example, the communication device 300 may be included on a system on a chip that includes BT communication resources and/or ZB communication resources coupled via coexistence interface(s) to WLAN communication resources. In an embodiment, collaborative coexistence between WLAN, BT, and/or ZB subsystems may be implemented by Packet Traffic Arbitration (PTA) logic (not shown) to pursue optimum performance for the particular circumstances and design constraints of a multi-network communication system. Through PTA embodiments, targeted quality levels for simultaneous voice, video, and data transmission on an embedded system can be achieved.

The power status evaluator 318 is to evaluate the battery life of other communication devices (e.g., the communication device 400) for use by the scheduler 310 in determining communication schedules. In embodiments, evaluating battery life includes tracking and comparing the battery lives of communication devices associated with TWT sessions.

For example, the communication device 300 may receive (e.g., in frames including a TWT element) the battery life values for each communication device associated with an existing TWT session and store them in the battery tables 326. Alternatively or additionally, the power status evaluator 318 may first estimate a battery life value based on battery information of the communication device (e.g., battery capacity, operation time, and power consumption rate). In embodiments, the power status evaluator 318 may use counting logic and the battery tables 326 to track the remaining battery life of each communication device. When a new TWT request is received from a STA, the power status evaluator 318 may access the battery tables 326 to compare the battery life value of the requesting STA with the battery life values of the STAs associated with existing TWT sessions. For example, the power status evaluator 318 may indicate in the battery tables 326 a ranking of battery life values from highest to lowest.

The scheduler 310 is to use the battery life values of communication devices to schedule and/or reschedule the timing for communication among communication devices. For example, the scheduler 310 may access the battery tables 326 (e.g., rankings) and schedule or reschedule TWT sessions based on the battery life values. The scheduler 310 may utilize the schedule tables 336 to store current and adjusted communication schedules. Although shown as separate functional blocks, the power status evaluator 318 and/or the scheduler 310 may be implemented by microcode or firmware, for example, as part of the MAC logic 314. In embodiments, power status evaluator 318 and/or scheduler 310 operations are triggered by TWT elements received from a STA.

Figure 4:
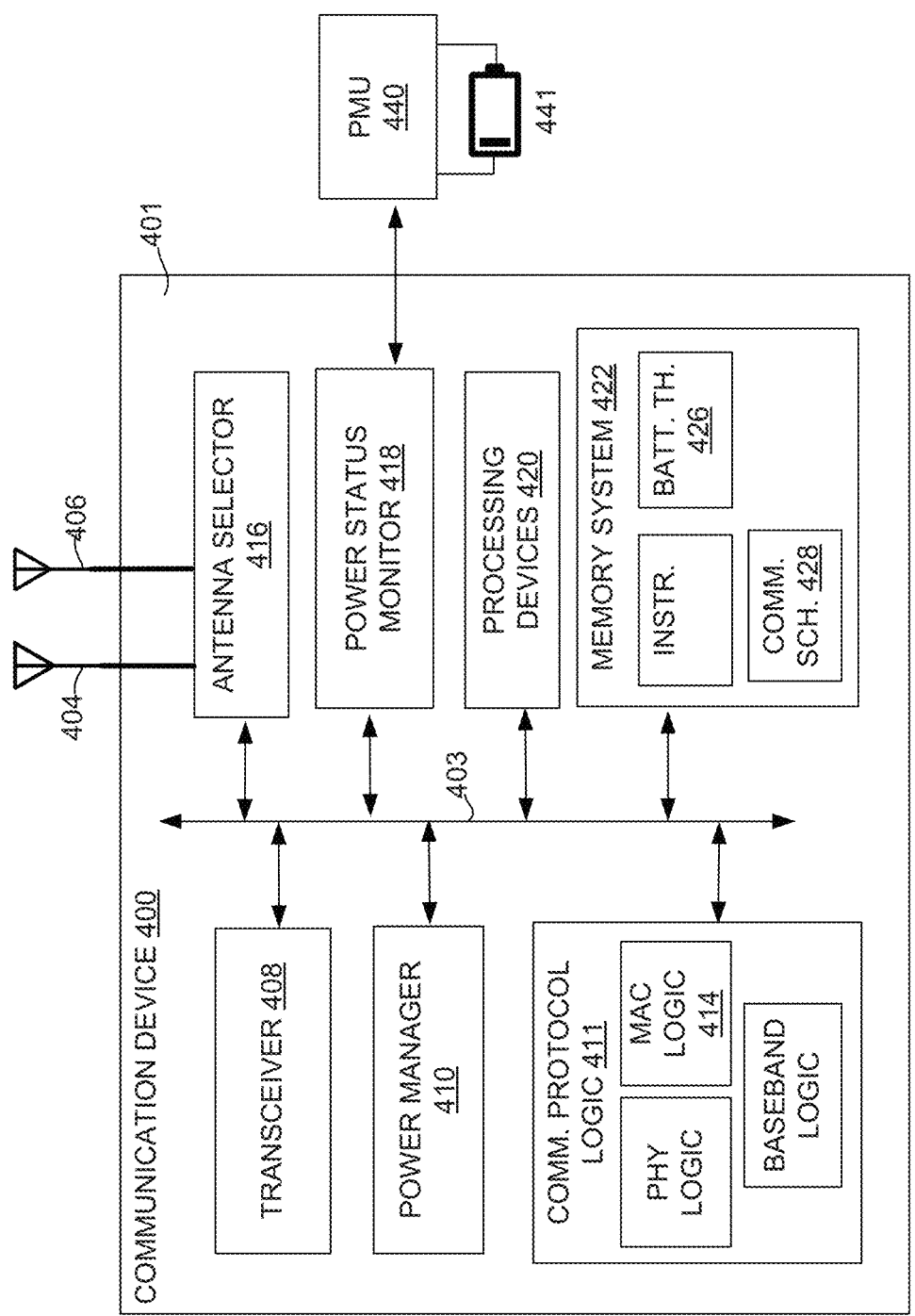
FIG. 4 is a block diagram illustrating another communication device, in accordance with embodiments.

FIG. 4 is a block diagram illustrating a communication device 400, in accordance with embodiments. The communication device 400 may be disposed on a substrate 401 such as PCB. The bus system 403, transceiver 408, communication protocol logic 411, antenna selector 416, antennas 404 and 406, processing devices 420, and the memory system 422 may be the same or similar to those of the communication device 300 of FIG. 3. In embodiments, the communication device 400 may provide the functionality of a STA in FIG. 1.

The power status monitor 418 is to track and report power status such as battery information associated with the communication device 400. The power status monitor 418 may receive battery information from an off-chip (e.g., or on-chip) power management unit (PMU) that manages charging/discharging of the battery 441. For example, power status monitor 418 may receive battery life measurements from a host CPU (not shown) that manages device charging functions via PMU 440 and corresponding circuits. Battery information may include, without limitation, battery life, battery capacity, power consumption rate, battery age, charge and discharge rates, and/or other battery attributes. In embodiments, the power status monitor 418 calculates the battery life of the communication device 400 using one or more of the battery attributes. The battery life may be expressed as a numerical value representing the remaining operation time, where the battery life is calculated based on remaining battery charge (e.g., battery capacity) and instantaneous power consumption rate. The power status monitor 418 may provide battery attributes to the communication protocol logic 411 to be transmitted to the communication device 300 for use in communication scheduling. For example, the MAC logic 414 may include the battery life value in an information element via a frame that also includes a TWT element (e.g., indicating a TWT request or a TWT teardown). The communication device 400 may transmit battery life values periodically and/or responsive to battery life values meeting or exceeding (e.g., a minimum) battery life threshold 426 stored in the memory system 422.

In the alternative or in addition to the functionality of the communication protocol logic 311 of FIG. 3, the communication protocol logic 411 of FIG. 4 is to operate according to a communication schedule that is based on the battery life of the communication device 400. In embodiments, the communication schedule is received from the communication device 300 and stored in the communication schedule 428. In embodiments, the MAC logic 414 is compatible with 802.11ax and is configured to process (e.g., inbound and outbound) TWT elements for the purpose of implementing TWT setup/teardown, TWT triggering, and other TWT mechanisms. Inbound and outbound TWT elements may be encoded in any 802.11 frame type. For outbound TWT elements, the MAC logic 414 may frame the TWT element together with a battery life value provided by the power status monitor 418. For inbound TWT elements, the MAC logic 414 may extract then store TWT scheduling parameters in communication schedule 428 of the memory system 422.

Power manager 410 controls power consumption by the communication device 400 based on the communication schedule 428 stored in the memory system 422. For example, when the time period has arrived, according to the communication schedule, for the communication device 400 to communicate data, the power manager 410 may cause the transceiver 408, the communication protocol logic 411, and/or other communication circuitry to receive sufficient power to wirelessly communicate. Outside of the time period scheduled for communication, the power manager 410 may cause power to be reduced or removed from the transceiver 408, the communication protocol logic 411, and/or other communication circuitry. The power manager 410 may also track power consumption by the communication device 400 over time and report it to the power status monitor 418. The power manager 410 may include hardware and/or software logic to physically and/or logically control power delivery to various components and circuitry of the communication device. An example interaction between communication devices for power status based communication scheduling is described with respect to FIG. 5. Example battery life based TWT scheduling by an AP is then described with respect to FIGS. 6-9.

Figure 5:
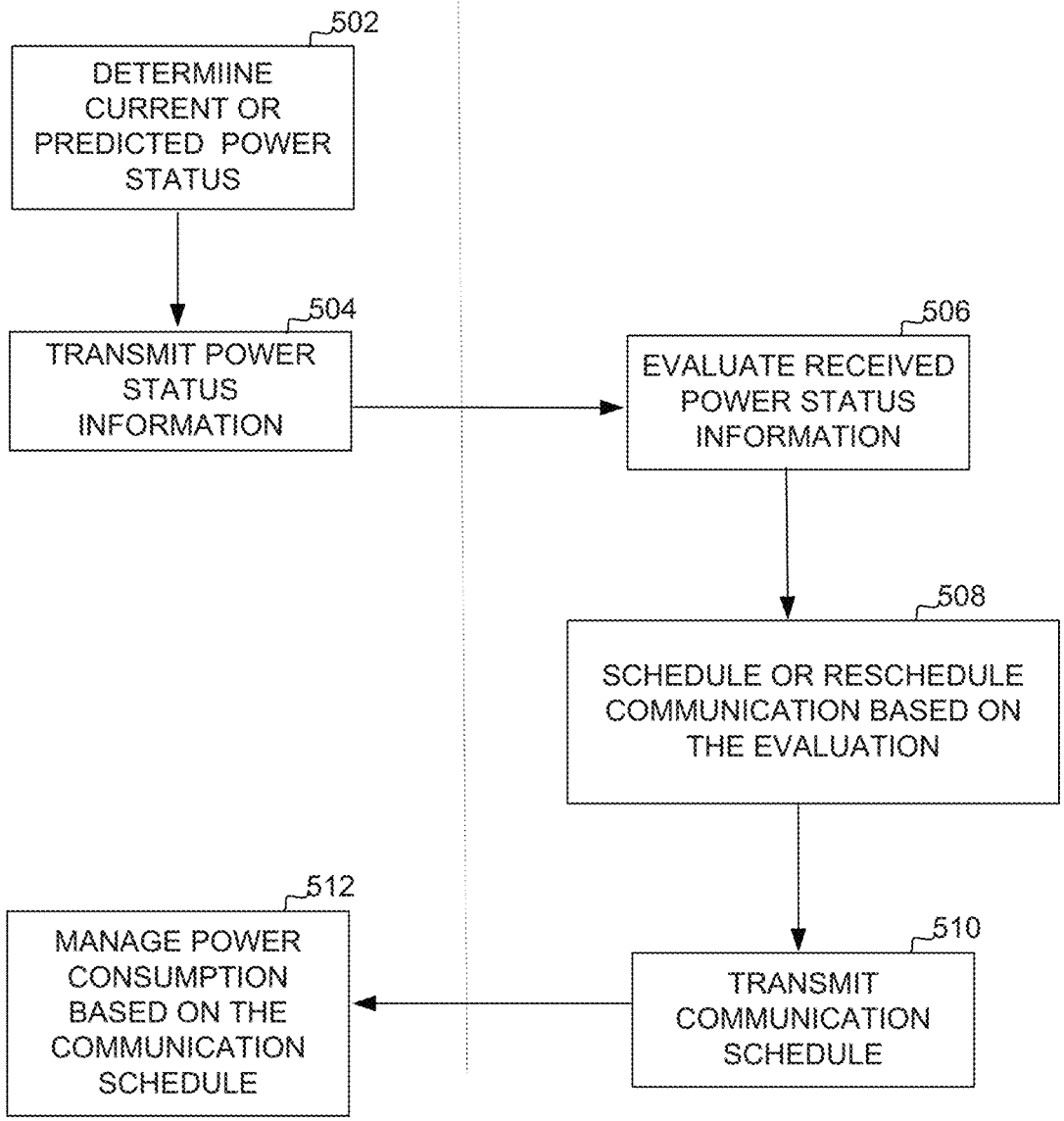
FIG. 5 is an interactive flow diagram illustrating a method of scheduling communication based on battery life, in accordance with embodiments.

FIG. 5 is an interactive flow diagram illustrating a method 500 of scheduling communication based on battery life, in accordance with embodiments. The method 500 can be performed by processing logic comprising hardware (circuitry, dedicated logic, etc.), software (such as is run on a general-purpose computing system or a dedicated machine), firmware (embedded software), or any combination thereof. In various embodiments, the method 500 may be performed as shown and described with respect to the communication device 300 of FIG. 3 and the communication device 400 of FIG. 4

At block 502, the power status monitor 418 monitors a power status of the communication device 400. The power status may relate to any source of power to the communication device without departing from the inventive subject matter. In embodiments the power status includes battery information associated with the battery 441, which battery information may be provided by external battery management logic (e.g., PMU 440). At block 504, the communication device 400 transmits a current or predicted power status to the communication device 300. The power status monitor 418 may provide raw power status data or power status data that has been modified to predict a current or future power status based on power capacity, discharge rates, charge rates, consumption rates, and the like.

At block 506, the power status evaluator 318 of the communication device 300 evaluates the received power status. Evaluation may include organizing the communication device 400 and other communication devices based on differences or similarities in their power status, current or predicted power consumption rates, throughput requirements, and/or other communication device attributes or network attributes (e.g., available bandwidth, channel congestion, etc.). At block 508, the scheduler 310 allocates or reallocates a communication schedule based on the evaluation. For example, when the results of the evaluation indicates it, a communication schedule may be generated or adjusted to prioritize communication by the communication device 400 over other communication devices. At block 510, the communication device 300 transmits the communication schedule to the communication device 400.

At block 512, the power manager 410 manages power consumption of the communication device 400, based on the communication schedule. Battery life based prioritization of the communication device 400 in the communication schedule can reduce the amount of time the communication device 400 must remain awake for communication so that it can sleep to avoid unnecessarily consuming power. Embodiments described in the context of TWT scheduling are described in more detail with respect to FIGS. 6-10.

Figure 7:
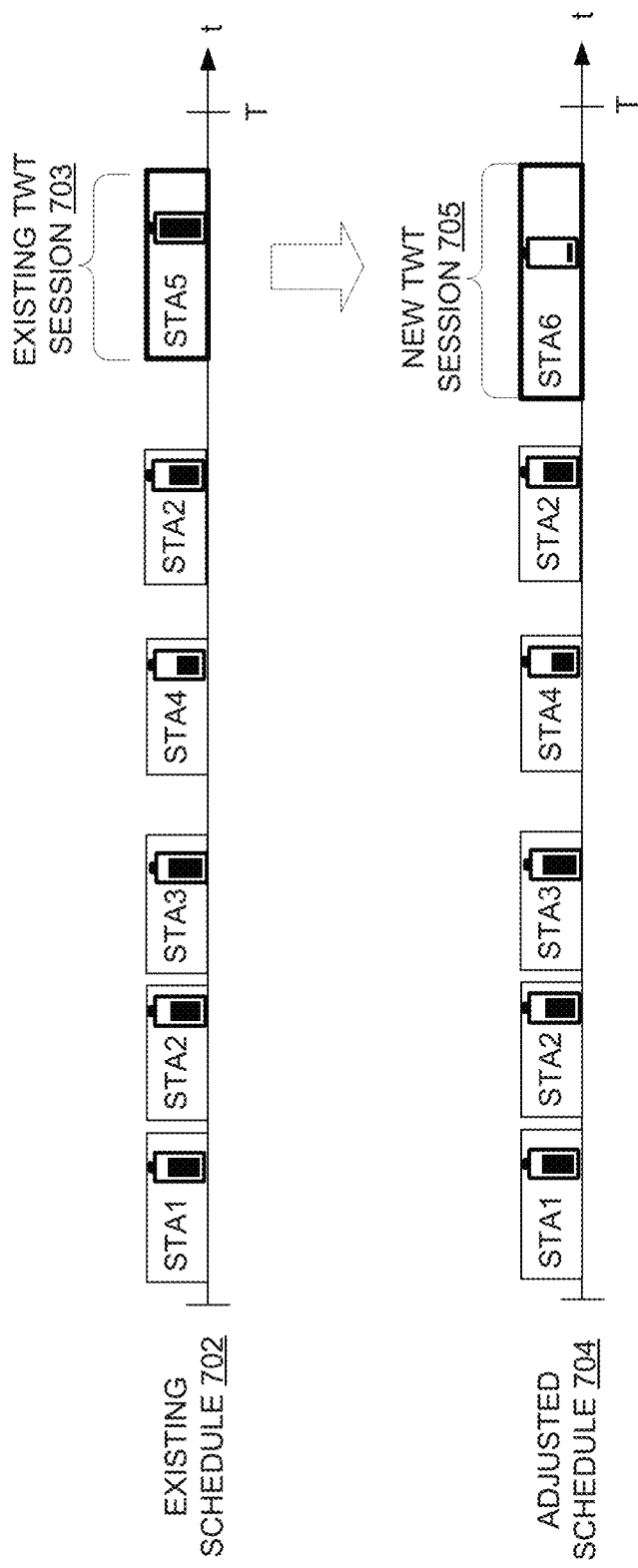
FIG. 7 illustrates an adjustment to a TWT schedule, based on battery life of a STA, in accordance with an embodiment.

FIG. 6 is a flow diagram illustrating a method 600 of TWT scheduling, based on battery life of a STA, in accordance with embodiments. The method 600 can be performed by processing logic comprising hardware (circuitry, dedicated logic, etc.), software (such as is run on a general-purpose computing system or a dedicated machine), firmware (embedded software), or any combination thereof. FIG. 7 illustrates an adjustment to TWT scheduling based on battery life of a STA, in accordance with an embodiment. Existing schedule 702 and adjusted schedule 704 each represent a time-based schedule of TWT sessions, where the AP allows one STA per TWT session. In various embodiments, the method 600 may be performed as shown and described with respect to FIGS. 1-5 and 7.

At block 602, the AP 102 receives a request (e.g., a TWT element 250) from STA 6 114 for a new TWT session. Referring to FIG. 7, it can be seen that STA 6 114 is not associated with an existing TWT session in the existing schedule 702. In the case that the STA 6 114 is already associated with an existing TWT session and the STA 6 114 senses that its battery life is low (e.g., less than a battery threshold value), it can initiate TWT teardown message in a frame together with an information element including its battery life value to report how long the STA 6 114 can operate based on current battery capacity and power consumption rate. When the teardown process is successfully completed, the STA 6 114 may then send the new TWT request to the AP 102, for example requesting a longer TWT wake interval for better power conservation. When the STA 6 114 requests the new TWT session, it may send the TWT request to the AP 102 in a frame together with an information element reporting its current battery life value.

At block 604, the AP 102 determines that timeslots are not available in the existing schedule 702 for the requested TWT session. Referring to FIG. 7, open timeslots are represented by the spaces between existing TWT sessions and the scheduler 310 can determine that the TWT session (e.g., see width of new TWT session 705) requested by the STA will not fit into the existing schedule 702.

At block 606, the AP 102 identifies that STA 5 110, associated with the existing TWT session 703, has a longer battery life than the STA 6 114. For example, the power status evaluator 318 may access the battery table 326 in the memory system 322 to compare battery values associated with the STAs in the existing schedule 702. For example, the battery tables 326 may include a ranking of the battery life values from highest to lowest.

The scheduler 310 may determine that the removal of existing TWT session 703 from the existing schedule 702 associated with STA 5 110 will free up timeslots for the TWT session requirements of the STA 6 114. Based on this determination, at block 608, the AP 102 tears down the existing TWT session 703 and creates a new TWT session 705 at block 610. At block 612, the scheduler 310 of the AP 102 allocates the new TWT session 705 to the STA 6 114.

Thus, in the scenario just described, where an AP allows one STA in each TWT session, the AP can run a rescheduling algorithm for the new TWT request. To reschedule, the AP reviews the existing TWT scheduling allocations as well as the remaining battery life of each STA. If additional channel timeslot resources are available, a new TWT session is created to accommodate the new TWT request. If sufficient timeslots are not available, then the AP identifies a STA with a longer battery life, tears down the corresponding TWT session, and allocates the channel timeslots to the new TWT request. After the corresponding TWT session is torn down, the STA with the longer battery life can still communicate with the AP through contention based enhanced distributed channel access (EDCA) protocol, until it can switch back to communication through TWT session again (e.g., as warranted by system load and battery life changes).

Figure 10:
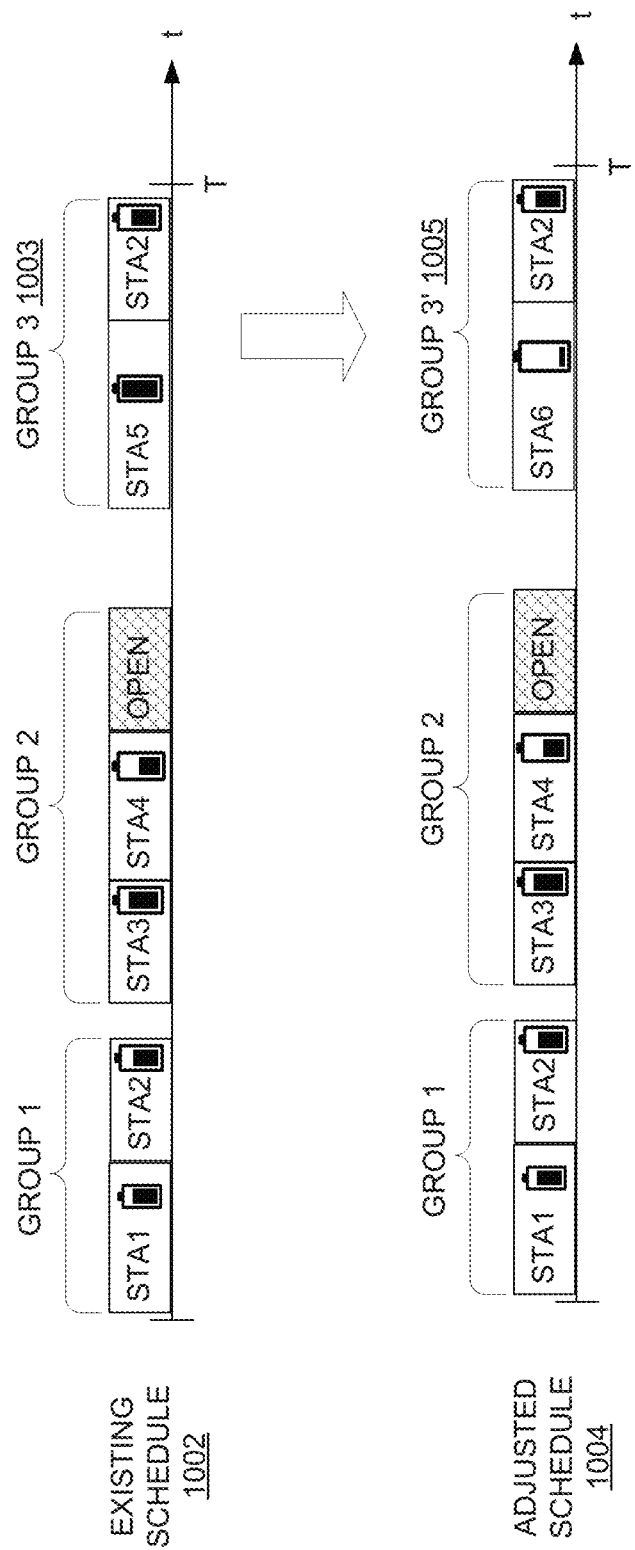

FIG. 8 is flow diagram illustrating another method 800 of TWT scheduling based on battery life of a STA, in accordance with embodiments. The flow can be performed by processing logic comprising hardware (circuitry, dedicated logic, etc.), software (such as is run on a general-purpose computing system or a dedicated machine), firmware (embedded software), or any combination thereof. FIGS. 9 and 10 illustrate adjustments to TWT scheduling based on battery life of a STA, in accordance with embodiments. Existing schedules 902, 1002 and adjusted schedules 904, 1004 each represents a time-based schedule of TWT sessions, where the AP 102 can associate multiple STAs with a TWT session (e.g., group TWT sessions). In various embodiments, the method 800 may be performed as shown and described with respect to FIGS. 1-5, 9 and 10.

At block 802, the AP 102 receives a TWT request (e.g., a TWT element 250) from the STA 6 114 for a TWT session. At block 804, the scheduler 310 of the AP 102 determines whether timeslots of an existing TWT session are available to accommodate the TWT request from the STA 6 114. For example, referring to FIG. 9, the scheduler 310 can review the existing schedule 902 and determine whether the requested TWT session can fit into the open timeslots within TWT group 2 903.

If sufficient timeslots are available, the method proceeds to block 806 where, referring to the adjusted schedule 904 of FIG. 9, the AP 102 allocates timeslots of the existing TWT session (e.g., TWT group 2' 905) to the STA 6 114. In addition, at block 808, the scheduler 310 of the AP 102 may prioritize communication within the existing TWT session (e.g., TWT group 2' 905) by STA with the lowest battery life. For example, TWT group 2' 905 illustrates STA 6 114 communicating first followed by STA 4 112 and STA 3 108, in order of increasing battery life. In embodiments, the AP 102 may use a TWT element to trigger the STA 6 114 to communicate before the STA 4 112 and the STA 3 108 during the TWT session.

If the scheduler 310 determines that sufficient timeslots of an existing TWT session are not available to accommodate the TWT request from the STA 6 114, the method proceeds to block 810 where, referring to the existing schedule 1002 of FIG. 10, the AP 102 identifies that the STA 5 110 associated with an existing TWT session (e.g., TWT group 3 1003) has a longer battery life than the STA 6 114. Then, at block 812, referring to the adjusted schedule 1004 of FIG. 10, the scheduler 310 removes or disassociates the STA 5 110 from the existing TWT session (e.g., TWT group 3 1003) and at block 814 allocates the freed up timeslots of the existing TWT session (e.g., TWT group 3' 1005) to the STA 6 114. At block 816, the AP 102 prioritizes communication within the existing TWT session by STA with the lowest battery life (e.g. using one or more TWT element triggers).

As discussed, if the AP 102 allows multiple STAs to share a single TWT session, the AP can prioritize STAs with the shorter battery life so that these STAs can switch back to low power state for better power preservation. In this scenario, when the AP receives a new TWT request with a battery life information element, the AP first reviews all existing TWT sessions and tries to allocate an existing TWT session to the requesting STA. If the AP cannot find an existing TWT session to satisfy this requirement, the AP may create a new TWT session if channel timeslot resource allows to do so, or if not, then the AP can remove one or more STAs having the longest battery life out of existing TWT session. By doing that, STAs with the shorter estimated battery life can get more frequent power saving access through TWT scheduling. If a STA does not get chance to be scheduled through TWT, it still can communicate with AP through contention based protocol (e.g., EDCA).

Thus, embodiments utilize power status information to generate communication schedules that facilitate wireless device wake and sleep timing such that the depletion rate of the wireless device's battery life is slowed and consequently, operation time for the entire network can be extended.

Figure 11:
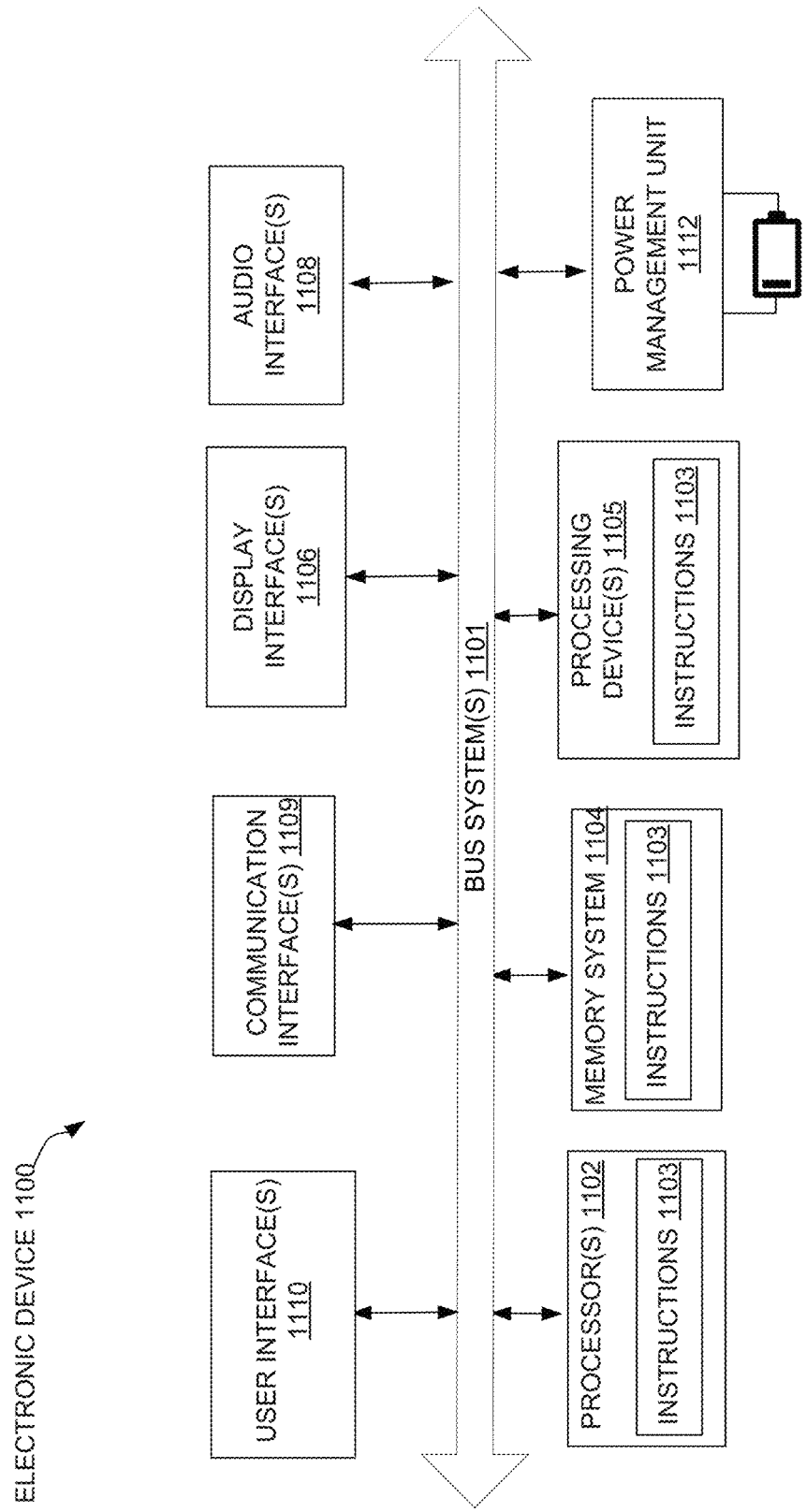
FIG. 11 is a block diagram illustrating an electronic device, in accordance with embodiments.

FIG. 11 is a block diagram illustrating an electronic device 1100, in accordance with embodiments. The electronic device 1100 may fully or partially include and/or operate the example embodiments of the communication device 300 (e.g., an AP), the communication device 400 (e.g., a STA), or portions thereof, as described with respect to FIGS. 1-10. The electronic device 1100 may be in the form of a computer system within which sets of instructions may be executed to cause the electronic device 1100 to perform any one or more of the methodologies discussed herein. The electronic device 1100 may operate as a standalone device or may be connected (e.g., networked) to other machines. In a networked deployment, the electronic device 1100 may operate in the capacity of a server or a client machine in server-client network environment, or as a peer machine in a P2P (or distributed) network environment.

The electronic device 1100 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, a speaker, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 1100 is illustrated, the term "device" shall also be taken to include any collection of machines that individually or jointly execute a set (or multiple sets) of instructions to perform any one or more of the methodologies discussed herein.

The electronic device 1100 is shown to include processor(s) 1102. In embodiments, the electronic device 1100 and/or processors(s) 1102 may include processing device(s) 1105 such as a System on a Chip processing device, developed by Cypress Semiconductor Corporation, San Jose, California. Alternatively, the electronic device 1100 may include one or more other processing devices known by those of ordinary skill in the art, such as a microprocessor or central processing unit, an application processor, a host controller, a controller, a special-purpose processor, a digital signal processor (DSP), an application specific integrated circuit (ASIC), a field programmable gate array (FPGA), or the like. Bus system 1101 may include a communication block (not shown) to communicate with an internal or external component, such as an embedded controller or an application processor, via communication interfaces(s) 1109 and/or bus system 1101.

Components of the electronic device 1100 may reside on a common carrier substrate such as, for example, an IC die substrate, a multi-chip module substrate, or the like. Alternatively, components of the electronic device 1100 may be one or more separate ICs and/or discrete components.

The memory system 1104 may include volatile memory and/or non-volatile memory which may communicate with one another via the bus system 1101. The memory system 1104 may include, for example, random access memory (RAM) and program flash. RAM may be static RAM (SRAM), and program flash may be a non-volatile storage, which may be used to store firmware (e.g., control algorithms executable by processor(s) 1102 to implement operations described herein). The memory system 1104 may include instructions 1103 that when executed perform the methods described herein. Portions of the memory system 1104 may be dynamically allocated to provide caching, buffering, and/or other memory based functionalities.

The memory system 1104 may include a drive unit providing a machine-readable medium on which may be stored one or more sets of instructions 1103 (e.g., software) embodying any one or more of the methodologies or functions described herein. The instructions 1103 may also reside, completely or at least partially, within the other memory devices of the memory system 1104 and/or within the processor(s) 1102 during execution thereof by the electronic device 1100, which in some embodiments, constitutes machine-readable media. The instructions 1103 may further be transmitted or received over a network via the communication interfaces(s) 1109.

While a machine-readable medium is in some embodiments a single medium, the term "machine-readable medium" should be taken to include a single medium or multiple media (e.g., a centralized or distributed database, and/or associated caches and servers) that store one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 1100 is further shown to include display interface(s) 1106 (e.g., a liquid crystal display (LCD), a touchscreen, a cathode ray tube (CRT), and software and hardware support for display technologies), and audio interface(s) 1108 (e.g., microphones, speakers and software and hardware support for microphone input/output and speaker input/output). The electronic device 1100 is also shown to include user interface(s) 1110 (e.g., keyboard, buttons, switches, touchpad, touchscreens, and software and hardware support for user interfaces). The power management unit 1112 may utilize software and/or hardware logic to manage battery and discharge operations. In embodiments, the power management unit 1112 may also manage power delivery to selected circuitry of the electronic device (e.g., the communication interfaces 1109) based on battery life.

The above description is intended to be illustrative, and not restrictive. For example, the above-described embodiments (or one or more aspects thereof) may be used in combination with each other. Other embodiments will be apparent to those skilled in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method, comprising:
    comparing a first battery life value of a first wireless device with a second battery life value of a second wireless device; and
    in response to determining, based on the comparing, that the first battery life value is less than the second battery life, adjusting a communication schedule to reallocate a first timeslot of the second wireless device to the first wireless device by tearing down an existing TWT session of the second wireless device in the communication schedule so that after the adjusting, a duration of awake state operation of the first wireless device using the first timeslot is less than a duration of awake state operation of the second wireless device using a second timeslot in the communication schedule.

2. The method of claim 1, further comprising transmitting to the first wireless device a target wake time (TWT) element defining a TWT session for the first wireless device according to the adjusted communication schedule.

3. The method of claim 1, further comprising:
receiving battery information transmitted from the first wireless device; and
calculating the first battery life value based on the battery information, wherein the battery information includes a remaining battery charge and a power consumption rate of the first wireless device.

4. The method of claim 1, wherein:
the first battery life value represents a remaining operation time of the first wireless device calculated based on a remaining battery charge of the first wireless device and a power consumption rate of the first wireless device.

5. The method of claim 1, further comprising:
for each wireless device of a plurality of wireless devices including the second wireless device, tracking remaining battery life of the wireless device by, in a battery table, recording a battery life value obtained from the wireless device; and
performing the comparing by obtaining the second battery life value from the battery table.

6. The method of claim 1, wherein:
the comparing of the first battery life value with the second battery life value is performed in response to receiving a request from the first wireless device to establish a TWT session for the first wireless device.

7. The method of claim 1, further comprising:
when the first wireless device is scheduled in a group TWT session with the second wireless device, causing the first wireless device to enter a sleep state prior to the second wireless device entering a sleep state by scheduling triggering of communication by the first wireless device at a time prior to triggering of communication by the second wireless device.

8. The method of claim 1, wherein the first timeslot is scheduled earlier within a TWT group than the second timeslot allocated to the second wireless device.

9. The method of claim 1, further comprising:
in the communication schedule, scheduling a plurality of wireless devices within a TWT group in a sequence corresponding to an order of increasing battery life, wherein, during the TWT group:
each wireless device of the plurality of wireless devices:
operates in an awake state until triggered to communicate, and
operates in a sleep state in response to completing communication, and
the plurality of wireless devices includes the first wireless device and the second wireless device.

10. The method of claim 1, wherein adjusting the communication schedule comprises:
allocating a new TWT session in the communication schedule for the first wireless device.

11. A method, comprising:
in a first communication device of a plurality of communication devices, comparing battery life values of the plurality of communication devices;
based on the comparing, reallocating a first timeslot from one of the plurality of communication devices to a second communication device having a least remaining battery life of the plurality of communication devices, by tearing down an existing TWT session of the one of the plurality of communication device, to decrease in a communication schedule a duration of a period of operation in an awake state of the second communication device.

12. The method of claim 11, further comprising transmitting a TWT element to the second communication device to:
cause the second communication device to operate in a sleep state following the period of operation in the awake state, wherein the TWT element defines a TWT session for the second communication device.

13. The method of claim 11, further comprising:
at the first communication device, receiving battery information transmitted from the second communication device; and
calculating a battery life value for the second communication device based on the battery information, wherein the battery information includes a remaining battery charge and a power consumption rate of the second communication device.

14. The method of claim 11, wherein:
each of the first communication device and the second communication device are peer machines in a peer-to-peer (P2P) network.

15. The method of claim 11, further comprising:
for each communication device of the plurality of communication devices, tracking remaining battery life of the communication device by, in a battery table, recording a battery life value obtained from the communication device; and
in response to receiving a TWT request from the second communication device, performing the comparing by obtaining the remaining battery life of the second communication device from the battery table.

16. The method of claim 11, wherein:
the comparing is performed in response to receiving a TWT request from the second communication device to establish a TWT session for the second communication device; and
the communication schedule defines a TWT session for each of the plurality of communication devices.

17. The method of claim 11, further comprising:
when the second communication device is scheduled in a group TWT session with the plurality of communication devices, causing the second communication device to enter a sleep state prior to any of the plurality of communication devices entering a sleep state by scheduling triggering of communication by the second communication device at a time prior to triggering of communication by any of the plurality of communication devices.

18. The method of claim 11,
wherein the first timeslot is scheduled earlier within the TWT group than timeslots allocated to the plurality of communication devices, wherein an end of a first wake period corresponds to an end of the first timeslot.

19. The method of claim 11, further comprising:
in the communication schedule, scheduling the plurality of communication devices within a TWT group in a sequence corresponding to an order of increasing battery life,
wherein, during the TWT group, each communication device of the plurality of communication devices:
operates in an awake state until triggered to communicate, and
operates in a sleep state in response to completing communication.

20. The method of claim 11, further comprising:
allocating a new TWT session for the second communication device.

* * * * *